(12) United States Patent
Kothari et al.

(10) Patent No.: US 7,119,945 B2
(45) Date of Patent: Oct. 10, 2006

(54) ALTERING TEMPORAL RESPONSE OF MICROELECTROMECHANICAL ELEMENTS

(75) Inventors: Manish Kothari, Redwood City, CA (US); William J. Cummings, San Francisco, CA (US)

(73) Assignee: IDC, LLC, San Francisco, CA (US)

( * ) Notice: Subject to any disclaimer, the term of this patent is extended or adjusted under 35 U.S.C. 154(b) by 153 days.

(21) Appl. No.: 10/794,737

(22) Filed: Mar. 3, 2004

(65) Prior Publication Data

US 2005/0195467 A1  Sep. 8, 2005

(51) Int. Cl.
G02B 26/00 (2006.01)
G02B 29/08 (2006.01)
G02B 5/08 (2006.01)

(52) U.S. Cl. .............. 359/292; 359/224; 359/290; 359/291; 359/298; 359/846; 359/849

(58) Field of Classification Search .............. 359/201, 359/202, 223, 224, 225, 290–292, 298, 318, 359/846, 849–851, 872
See application file for complete search history.

(56) References Cited

U.S. PATENT DOCUMENTS

| | | | |
|---|---|---|---|
| 2,534,846 A | 12/1950 | Ambrose et al. | |
| 3,439,973 A | 4/1969 | Paul et al. | |
| 3,443,854 A | 5/1969 | Weiss | |
| 3,653,741 A | 4/1972 | Marks et al. | |
| 3,656,836 A | 4/1972 | de Cremoux et al. | |
| 3,813,265 A | 5/1974 | Marks | |
| 3,955,880 A | 5/1976 | Lierke | |
| 4,099,854 A | 7/1978 | Decker et al. | |
| 4,228,437 A | 10/1980 | Shelton | |
| 4,377,324 A | 3/1983 | Durand et al. | |
| 4,389,096 A | 6/1983 | Hori et al. | |
| 4,392,711 A | 7/1983 | Moraw et al. | |
| 4,403,248 A | 9/1983 | te Velde | |
| 4,441,791 A | 4/1984 | Hornbeck | |
| 4,445,050 A | 4/1984 | Marks | |
| 4,459,182 A | 7/1984 | te Velde | |
| 4,482,213 A | 11/1984 | Piliavin et al. | |
| 4,500,171 A | 2/1985 | Penz et al. | |
| 4,519,676 A | 5/1985 | te Velde | |
| 4,531,126 A | 7/1985 | Sadones | |
| 4,566,935 A | 1/1986 | Hornbeck | |
| 4,571,603 A | 2/1986 | Hornbeck et al. | |
| 4,596,992 A | 6/1986 | Hornbeck | |
| 4,615,595 A | 10/1986 | Hornbeck | |

(Continued)

FOREIGN PATENT DOCUMENTS

CN 157313 5/1991

(Continued)

OTHER PUBLICATIONS

Bass, "Handbook of Optics, vol. I, Fundamentals, Techniques, and Design, Second Edition," McGraw-Hill, Inc., New York, pp. 2.29-2.36 (1995).

(Continued)

Primary Examiner—Evelyn A Lester
(74) Attorney, Agent, or Firm—Knobbe, Martens, Olson & Bear, LLP

(57) ABSTRACT

An array of movable elements is arranged on a substrate. Each element has a cavity and a movable member to move through the cavity. The pressure resistance of the elements varies, allowing actuation signals to be manipulated to activate elements with different pressure resistance at different levels of the actuation signal.

35 Claims, 6 Drawing Sheets

U.S. PATENT DOCUMENTS

| | | |
|---|---|---|
| 4,662,746 A | 5/1987 | Hornbeck |
| 4,663,083 A | 5/1987 | Marks |
| 4,681,403 A | 7/1987 | te Velde et al. |
| 4,710,732 A | 12/1987 | Hornbeck |
| 4,748,366 A | 5/1988 | Taylor |
| 4,786,128 A | 11/1988 | Birnbach |
| 4,790,635 A | 12/1988 | Apsley |
| 4,856,863 A | 8/1989 | Sampsell et al. |
| 4,857,978 A | 8/1989 | Goldburt et al. |
| 4,900,136 A | 2/1990 | Goldburt et al. |
| 4,900,395 A | 2/1990 | Syverson et al. |
| 4,954,789 A | 9/1990 | Sampsell |
| 4,956,619 A | 9/1990 | Hornbeck |
| 4,965,562 A | 10/1990 | Verhulst |
| 4,982,184 A | 1/1991 | Kirkwood |
| 5,018,256 A | 5/1991 | Hornbeck |
| 5,022,745 A | 6/1991 | Zayhowski et al. |
| 5,028,939 A | 7/1991 | Hornbeck et al. |
| 5,037,173 A | 8/1991 | Sampsell et al. |
| 5,044,736 A | 9/1991 | Jaskie et al. |
| 5,061,049 A | 10/1991 | Hornbeck |
| 5,075,796 A | 12/1991 | Schildkraut et al. |
| 5,078,479 A | 1/1992 | Vuilleumier |
| 5,079,544 A | 1/1992 | DeMond et al. |
| 5,083,857 A | 1/1992 | Hornbeck |
| 5,096,279 A | 3/1992 | Hornbeck et al. |
| 5,099,353 A | 3/1992 | Hornbeck |
| 5,124,834 A | 6/1992 | Cusano et al. |
| 5,142,405 A | 8/1992 | Hornbeck |
| 5,142,414 A | 8/1992 | Koehler |
| 5,153,771 A | 10/1992 | Link et al. |
| 5,162,787 A | 11/1992 | Thompson et al. |
| 5,168,406 A | 12/1992 | Nelson |
| 5,170,156 A | 12/1992 | DeMond et al. |
| 5,172,262 A | 12/1992 | Hornbeck |
| 5,179,274 A | 1/1993 | Sampsell |
| 5,192,395 A | 3/1993 | Boysel et al. |
| 5,192,946 A | 3/1993 | Thompson et al. |
| 5,206,629 A | 4/1993 | DeMond et al. |
| 5,214,419 A | 5/1993 | DeMond et al. |
| 5,214,420 A | 5/1993 | Thompson et al. |
| 5,216,537 A | 6/1993 | Hornbeck |
| 5,226,099 A | 7/1993 | Mignardi et al. |
| 5,228,013 A | 7/1993 | Bik |
| 5,231,532 A | 7/1993 | Magel et al. |
| 5,233,385 A | 8/1993 | Sampsell |
| 5,233,456 A | 8/1993 | Nelson |
| 5,233,459 A | 8/1993 | Bozler et al. |
| 5,254,980 A | 10/1993 | Hendrix et al. |
| 5,272,473 A | 12/1993 | Thompson et al. |
| 5,278,652 A | 1/1994 | Urbanus et al. |
| 5,280,277 A | 1/1994 | Hornbeck |
| 5,287,096 A | 2/1994 | Thompson et al. |
| 5,293,272 A | 3/1994 | Jannson et al. |
| 5,296,950 A | 3/1994 | Lin et al. |
| 5,305,640 A | 4/1994 | Boysel et al. |
| 5,311,360 A | 5/1994 | Bloom et al. |
| 5,312,513 A | 5/1994 | Florence et al. |
| 5,323,002 A | 6/1994 | Sampsell et al. |
| 5,324,683 A | 6/1994 | Fitch et al. |
| 5,325,116 A | 6/1994 | Sampsell |
| 5,326,430 A | 7/1994 | Cronin et al. |
| 5,327,286 A | 7/1994 | Sampsell et al. |
| 5,331,454 A | 7/1994 | Hornbeck |
| 5,339,116 A | 8/1994 | Urbanus et al. |
| 5,355,357 A | 10/1994 | Yamamori et al. |
| 5,358,601 A | 10/1994 | Cathey |
| 5,365,283 A | 11/1994 | Doherty et al. |
| 5,381,253 A | 1/1995 | Sharp et al. |
| 5,401,983 A | 3/1995 | Jokerst et al. |
| 5,411,769 A | 5/1995 | Hornbeck |
| 5,444,566 A | 8/1995 | Gale et al. |
| 5,446,479 A | 8/1995 | Thompson et al. |
| 5,448,314 A | 9/1995 | Heimbuch et al. |
| 5,452,024 A | 9/1995 | Sampsell |
| 5,454,906 A | 10/1995 | Baker et al. |
| 5,457,493 A | 10/1995 | Leddy et al. |
| 5,457,566 A | 10/1995 | Sampsell et al. |
| 5,459,602 A | 10/1995 | Sampsell |
| 5,459,610 A | 10/1995 | Bloom et al. |
| 5,461,411 A | 10/1995 | Florence et al. |
| 5,474,865 A | 12/1995 | Vasudev |
| 5,489,952 A | 2/1996 | Gove et al. |
| 5,497,172 A | 3/1996 | Doherty et al. |
| 5,497,197 A | 3/1996 | Gove et al. |
| 5,499,037 A | 3/1996 | Nakagawa et al. |
| 5,499,062 A | 3/1996 | Urbanus |
| 5,500,635 A | 3/1996 | Mott |
| 5,500,761 A | 3/1996 | Goossen et al. |
| 5,506,597 A | 4/1996 | Thompson et al. |
| 5,515,076 A | 5/1996 | Thompson et al. |
| 5,517,347 A | 5/1996 | Sampsell |
| 5,523,803 A | 6/1996 | Urbanus et al. |
| 5,526,051 A | 6/1996 | Gove et al. |
| 5,526,172 A | 6/1996 | Kanack |
| 5,526,327 A | 6/1996 | Cordova, Jr. |
| 5,526,688 A | 6/1996 | Boysel et al. |
| 5,535,047 A | 7/1996 | Hornbeck |
| 5,548,301 A | 8/1996 | Kornher et al. |
| 5,551,293 A | 9/1996 | Boysel et al. |
| 5,552,924 A | 9/1996 | Tregilgas |
| 5,552,925 A | 9/1996 | Worley |
| 5,559,358 A | 9/1996 | Burns et al. |
| 5,563,398 A | 10/1996 | Sampsell |
| 5,567,334 A | 10/1996 | Baker et al. |
| 5,570,135 A | 10/1996 | Gove et al. |
| 5,579,149 A | 11/1996 | Moret et al. |
| 5,581,272 A | 12/1996 | Conner et al. |
| 5,583,688 A | 12/1996 | Hornbeck |
| 5,589,852 A | 12/1996 | Thompson et al. |
| 5,597,736 A | 1/1997 | Sampsell |
| 5,600,383 A | 2/1997 | Hornbeck |
| 5,602,671 A | 2/1997 | Hornbeck |
| 5,606,441 A | 2/1997 | Florence et al. |
| 5,608,468 A | 3/1997 | Gove et al. |
| 5,610,438 A | 3/1997 | Wallace et al. |
| 5,610,624 A | 3/1997 | Bhuva |
| 5,610,625 A | 3/1997 | Sampsell |
| 5,619,059 A | 4/1997 | Li et al. |
| 5,619,365 A | 4/1997 | Rhoads et al. |
| 5,619,366 A | 4/1997 | Rhoads et al. |
| 5,629,790 A | 5/1997 | Neukermans et al. |
| 5,636,052 A | 6/1997 | Arney et al. |
| 5,636,185 A | 6/1997 | Brewer et al. |
| 5,646,768 A | 7/1997 | Kaeriyama |
| 5,650,881 A | 7/1997 | Hornbeck |
| 5,654,741 A | 8/1997 | Sampsell et al. |
| 5,657,099 A | 8/1997 | Doherty et al. |
| 5,659,374 A | 8/1997 | Gale, Jr. et al. |
| 5,665,997 A | 9/1997 | Weaver et al. |
| 5,673,139 A | 9/1997 | Johnson |
| 5,683,591 A | 11/1997 | Offenberg |
| 5,703,710 A | 12/1997 | Brinkman et al. |
| 5,710,656 A | 1/1998 | Goossen |
| 5,726,480 A | 3/1998 | Pister |
| 5,739,945 A | 4/1998 | Tayebati |
| 5,740,150 A | 4/1998 | Uchimaru et al. |
| 5,745,193 A | 4/1998 | Urbanus et al. |
| 5,745,281 A | 4/1998 | Yi et al. |
| 5,751,469 A * | 5/1998 | Arney et al. ................ 359/291 |
| 5,771,116 A | 6/1998 | Miller et al. |
| 5,784,190 A | 7/1998 | Worley |
| 5,784,212 A | 7/1998 | Hornbeck |
| 5,793,504 A | 8/1998 | Stoll |

| | | |
|---|---|---|
| 5,808,780 A | 9/1998 | McDonald |
| 5,818,095 A | 10/1998 | Sampsell |
| 5,825,528 A | 10/1998 | Goossen |
| 5,835,255 A | 11/1998 | Miles |
| 5,842,088 A | 11/1998 | Thompson |
| 5,912,758 A | 6/1999 | Knipe et al. |
| 5,943,158 A | 8/1999 | Ford et al. |
| 5,986,796 A | 11/1999 | Miles |
| 6,028,690 A | 2/2000 | Carter et al. |
| 6,038,056 A | 3/2000 | Florence et al. |
| 6,040,937 A | 3/2000 | Miles |
| 6,049,317 A | 4/2000 | Thompson et al. |
| 6,055,090 A | 4/2000 | Miles |
| 6,061,075 A | 5/2000 | Nelson et al. |
| 6,099,132 A | 8/2000 | Kaeriyama |
| 6,100,872 A | 8/2000 | Aratani et al. |
| 6,113,239 A | 9/2000 | Sampsell et al. |
| 6,147,790 A | 11/2000 | Meier et al. |
| 6,158,156 A | 12/2000 | Patrick |
| 6,160,833 A | 12/2000 | Floyd et al. |
| 6,180,428 B1 | 1/2001 | Peeters et al. |
| 6,201,633 B1 | 3/2001 | Peeters et al. |
| 6,232,936 B1 | 5/2001 | Gove et al. |
| 6,243,149 B1 | 6/2001 | Swanson et al. |
| 6,282,010 B1 | 8/2001 | Sulzbach et al. |
| 6,295,154 B1 | 9/2001 | Laor et al. |
| 6,323,982 B1 | 11/2001 | Hornbeck |
| 6,335,831 B1 | 1/2002 | Kowarz et al. |
| 6,407,851 B1 | 6/2002 | Islam et al. |
| 6,447,126 B1 | 9/2002 | Hornbeck |
| 6,465,355 B1 | 10/2002 | Horsley |
| 6,466,358 B1 | 10/2002 | Tew |
| 6,473,274 B1 | 10/2002 | Maimone et al. |
| 6,480,177 B1 | 11/2002 | Doherty et al. |
| 6,496,122 B1 | 12/2002 | Sampsell |
| 6,545,335 B1 | 4/2003 | Chua et al. |
| 6,548,908 B1 | 4/2003 | Chua et al. |
| 6,549,338 B1 | 4/2003 | Wolverton et al. |
| 6,552,840 B1 | 4/2003 | Knipe |
| 6,574,033 B1 | 6/2003 | Chui et al. |
| 6,589,625 B1 | 7/2003 | Kothari et al. |
| 6,600,201 B1 | 7/2003 | Hartwell et al. |
| 6,606,175 B1 | 8/2003 | Sampsell et al. |
| 6,625,047 B1 | 9/2003 | Coleman, Jr. |
| 6,630,786 B1 | 10/2003 | Cummings et al. |
| 6,632,698 B1 | 10/2003 | Ives |
| 6,643,069 B1 | 11/2003 | Dewald |
| 6,650,455 B1 | 11/2003 | Miles |
| 6,666,561 B1 | 12/2003 | Blakley |
| 6,674,090 B1 | 1/2004 | Chua et al. |
| 6,674,562 B1 | 1/2004 | Miles |
| 6,680,792 B1 | 1/2004 | Miles |
| 6,710,908 B1 | 3/2004 | Miles et al. |
| 6,741,377 B1 | 5/2004 | Miles |
| 6,741,384 B1 | 5/2004 | Martin et al. |
| 6,741,503 B1 | 5/2004 | Farris et al. |
| 6,747,785 B1 | 6/2004 | Chen et al. |
| 6,775,174 B1 | 8/2004 | Huffman et al. |
| 6,778,155 B1 | 8/2004 | Doherty et al. |
| 6,794,119 B1 | 9/2004 | Miles |
| 6,811,267 B1 | 11/2004 | Allen et al. |
| 6,819,469 B1 | 11/2004 | Koba |
| 6,822,628 B1 | 11/2004 | Dunphy et al. |
| 6,829,132 B1 | 12/2004 | Martin et al. |
| 6,853,129 B1 | 2/2005 | Cummings et al. |
| 6,855,610 B1 | 2/2005 | Tung et al. |
| 6,859,218 B1 | 2/2005 | Luman et al. |
| 6,861,277 B1 | 3/2005 | Monroe et al. |
| 6,862,022 B1 | 3/2005 | Slupe |
| 6,862,029 B1 | 3/2005 | D'Souza et al. |
| 6,867,896 B1 | 3/2005 | Miles |
| 6,870,581 B1 | 3/2005 | Li et al. |
| 2001/0003487 A1 | 6/2001 | Miles |
| 2002/0015215 A1 | 2/2002 | Miles |
| 2002/0021485 A1 | 2/2002 | Pilossof |
| 2002/0024711 A1 | 2/2002 | Miles |
| 2002/0054424 A1 | 5/2002 | Miles |
| 2002/0075555 A1 | 6/2002 | Miles |
| 2002/0114558 A1 | 8/2002 | Nemirovsky |
| 2002/0126364 A1 | 9/2002 | Miles |
| 2002/0146200 A1 | 10/2002 | Kurdle et al. |
| 2002/0149828 A1 | 10/2002 | Miles |
| 2003/0016428 A1 | 1/2003 | Kato et al. |
| 2003/0043157 A1 | 3/2003 | Miles |
| 2003/0072070 A1 | 4/2003 | Miles |
| 2003/0202264 A1 | 10/2003 | Weber et al. |
| 2003/0202265 A1 | 10/2003 | Reboa et al. |
| 2003/0202266 A1 | 10/2003 | Ring et al. |
| 2004/0051929 A1 | 3/2004 | Sampsell et al. |
| 2004/0058532 A1 | 3/2004 | MIles et al. |
| 2004/0080807 A1 | 4/2004 | Chen et al. |
| 2004/0145049 A1 | 7/2004 | McKinnell et al. |
| 2004/0147056 A1 | 7/2004 | McKinnell et al. |
| 2004/0160143 A1 | 8/2004 | Shreeve et al. |
| 2004/0174583 A1 | 9/2004 | Chen et al. |
| 2004/0179281 A1 | 9/2004 | Reboa |
| 2004/0212026 A1 | 10/2004 | Van Brocklin et al. |
| 2004/0217378 A1 | 11/2004 | Martin et al. |
| 2004/0217919 A1 | 11/2004 | Pichl et al. |
| 2004/0218251 A1 | 11/2004 | Piehl et al. |
| 2004/0218334 A1 | 11/2004 | Martin et al. |
| 2004/0218341 A1 | 11/2004 | Martin et al. |
| 2004/0227493 A1 | 11/2004 | Van Brocklin et al. |
| 2004/0240032 A1 | 12/2004 | Miles |
| 2004/0240138 A1 | 12/2004 | Martin et al. |
| 2004/0245588 A1 | 12/2004 | Nikkel et al. |
| 2004/0263944 A1 | 12/2004 | Miles et al. |
| 2005/0001828 A1 | 1/2005 | Martin et al. |
| 2005/0038950 A1 | 2/2005 | Adelmann |
| 2005/0057442 A1 | 3/2005 | Way |
| 2005/0068583 A1 | 3/2005 | Gutkowski et al. |
| 2005/0069209 A1 | 3/2005 | Damera-Venkata et al. |

FOREIGN PATENT DOCUMENTS

| | | |
|---|---|---|
| EP | 0 667 548 A1 | 8/1995 |
| EP | 1275997 | 1/2003 |
| JP | 05275401 A1 | 10/1993 |
| WO | WO 95/30924 | 11/1995 |
| WO | WO 97/17628 | 5/1997 |
| WO | WO 99/52006 A2 | 10/1999 |
| WO | WO 99/52006 A3 | 10/1999 |
| WO | WO 02079853 | 10/2002 |
| WO | WO 03/007049 A1 | 1/2003 |
| WO | WO 03/069413 A1 | 8/2003 |
| WO | WO 03/073151 A1 | 9/2003 |
| WO | WO 04/006003 A1 | 1/2004 |
| WO | WO 04/026757 A2 | 4/2004 |

OTHER PUBLICATIONS

Giles et al., "A Silicon MEMS Optical Switch Attenuator and Its Use in Lightwave Subsystems," IEEE Journal of Selected Topics in Quanum Electronics, vol. 5, No. 1, pp. 18-25, (Jan./Feb. 1999).

Ibbotson et al., "Comparison of XeF2 and F-atom reactions with Si and SiO2," Applied Physics Letters, vol. 44, No. 12, pp. 1129-1131 (Jun. 1984).

Schnakenberg, et al. TMAHW Etchants for Silicon Micromachining. 1991 International Conference on Solid State Sensors and Actuators—Digest of Technical Papers, pp. 815-818.

Williams, et al. Etch Rates for Micromachining Processing. Journal of Microelectromechanical Systems, vol. 5, No. 4, pp. 256-259 (Dec. 1996).

Winters, et al. The etching of silicon with XeF2 vapor. Applied Physics Letters, vol. 34, No. 1, pp. 70-73, (Jan. 1979).

Akasaka, "Three-Dimensional IC Trends," Proceedings of IEEE, vol. 74, No. 12, pp. 1703-1714 (Dec. 1986).

Aratani et al., "Process and Design Considerations for Surface Micromachined Beams for a Tuneable Interferometer Array in Silicon," Proc. IEEE Microelectromechanical Workshop, Fort Lauderdale, FL, pp. 230-235 (Feb. 1993).

Aratani et al., "Surface micromachined tuneable interferometer array," Sensors and Actuators, pp. 17-23 (1994).

Conner, "Hybrid Color Display Using Optical Interference Filter Array," SID Digest, pp. 577-580 (1993).

Goossen et al., "Possible Display Applications of the Silicon Mechanical Anti-Reflection Switch," Society for Information Display (1994).

Goossen et al., "Silicon Modulator Based on Mechanically-Active Anti-Reflective Layer with 1Mbit/sec Capability for Fiber-in-the-Loop Applications," IEEE Photonics Technology Letters, pp. 1119-1121 (Sep. 1994).

Gosch, "West Germany Grabs the Lead in X-Ray Lithography," Electronics, pp. 78-80 (Feb. 5, 1987).

Howard et al., "Nanometer-Scale Fabrication Techniques," VLSI Electronics: Microstructure Science, vol. 5, pp. 145-153, and pp. 166-173 (1982).

Jackson, "Classical Electrodynamics," John Wiley & Sons Inc., pp. 568-573, date unknown.

Jerman et al., "A Miniature Fabry-Perot Interferometer Fabricated Using Silicon Micromaching Techniques," IEEE Electron Devices Society (1998).

Johnson, "Optical Scanners," Microwave Scanning Antennas, vol. 1, pp. 251-261 (1964).

"Light over Matter," Circle No. 36 (Jun. 1993).

Miles, "A New Reflective FPD Technology Using Interferometric Modulation," The Proceedings of the Society for Information Display (May 11-16, 1997).

Newsbreaks, "Quantum-trench devices might operate at terahertz frequencies," Laser Focus World (May 1993).

Oliner, "Radiating Elements and Mutual Coupling," Microwave Scanning Antennas, vol. 2, 131-157 and pp. 190-194 (1966).

Raley et al., "A Fabry-Perot Microinterferometer for Visible Wavelengths," IEEE Solid-State Sensor and Actuator Workshop, Hilton Head, SC, pp. 170-173 (1992).

Sperger et al., "High Performance Patterned All-Dielectric Interference Colour Filter for Display Applications," SID Digest, pp. 81-83 (1994).

Stone, "Radiation and Optics, An Introduction to the Classical Theory," McGraw-Hill, pp. 340-343 (1963).

Walker et al., "Electron-beam-tunable Interference Filter Spatial Light Modulator," Optics Letters vol. 13, No. 5, pp. 345-347 (May 1988).

Winton, "A novel way to capture solar energy," Chemical Week, pp. 17-18 (May 15, 1985).

Wu et al., "Design of a Reflective Color LCD Using Interference Reflectors," ASIA Display '95, pp. 929-931 (Oct. 16, 1995).

International Search Report and Written Opinion of the International Searching Authority for PCT/US2005/005919 dated Aug. 24, 2005.

* cited by examiner

ALTERING TEMPORAL RESPONSE OF MICROELECTROMECHANICAL ELEMENTS

BACKGROUND

Microelectromechanical (MEMS) systems are generally made up of individual moving elements manufactured on a micrometer scale. Such elements as switches, tunable capacitors, mirrors for display and printing applications, etc., serve as MEMS examples. For purposes of this discussion, a MEMS device has at least one movable element, a cavity into or out of which the element moves, and some sort of actuation signal that causes the element to move.

In some applications, the actuation timing of the element, where the actuation is the movement of the element from one position to the next position, is a key portion of the operation of the device. In MEMS switches, for example, the switch elements may be cascaded and the response time of a first switch may determine the response time of the next switch, etc. In MEMS displays, the movement of the elements generally modulate light, and the timing of the modulation determines the image content seen by a viewer.

Having finer control of these elements by their response times may afford better operation, such as a higher image quality. Control of display elements by their response times, for example, may provide a higher bit depth for display applications.

BRIEF DESCRIPTION OF THE DRAWINGS

The invention may be best understood by reading the disclosure with reference to the drawings, wherein.

DETAILED DESCRIPTION OF THE EMBODIMENTS

Figure 1:
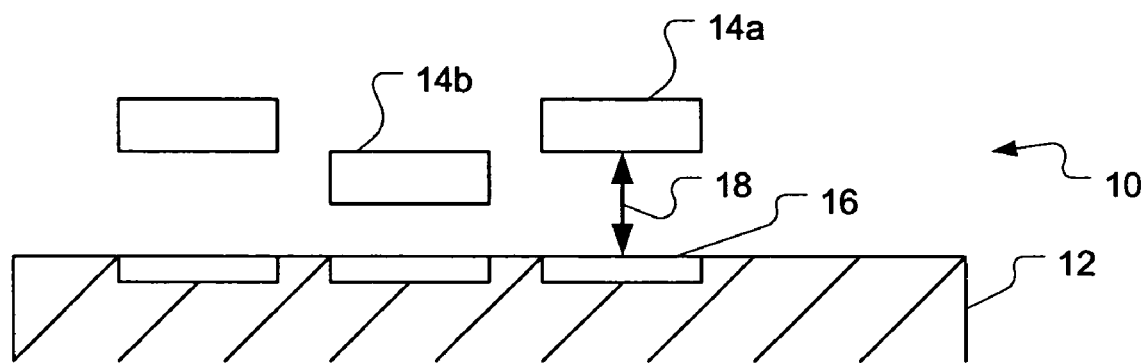
FIG. 1 shows an embodiment of a microelectromechanical element.

FIG. 1 shows a diagram of a generalized structure for a micromechanical element 10. This movable element 10 has a movable member 14 adjacent a cavity 18. Opposite the movable member 14 lies an actuator 16 of some sort, such as an address transistor or other component that allows actuation of the movable member of the element towards the substrate 12 into the cavity 18. Typically, the member of the element will be suspended over the substrate, but may also be oriented horizontally across the cavity, or the actuator may be the suspended portion of the movable element 10. Similarly, the movement through the cavity may be the motion of the member 14 into the cavity 18, as would occur if a member went from a position like member 14a to a position parallel to the position of member 14b. Alternatively, the movement may be in the opposite direction, starting at position 14b and ending at a position parallel to the position of member 14a.

When the member moves towards the substrate, gas trapped in the cavity 18 must escape. Depending upon the provisions made for such escape, the response time of the element may be affected. The response, or actuation, time is that period of time it takes for the movable member to reach its actuated position. If there is very little space allowed for the gas to escape, the mechanical resistance of the gas may act as a damping agent on the motion of the movable member of the element. This damping due to mechanical resistance will be referred to here as pressure resistance. The pressure resistance can be exploited to allow finer control of the response of the elements.

Air or other gases under pressure may act as if they were fluids, and the resistance caused by the gas is similar to that of viscous fluid damping. When the gas resides in a gap that is very small, it no longer acts as a fluid, but resists movement by the pressure of the gas itself. The pressure would be calculated in the small gap case with the formula of Pressure*Volume=constant. In the case of movable elements, the pressure resistance of the gas between the movable member and the substrate or other fixed structure may be viscous fluid damping initially, and as the gap closes become pressure as characterized above.

This pressure resistance may be manipulated by varying the pressure resistance across the elements, where different elements have different pressure resistances and therefore have different response times. A different approach, where the response time is altered for movable elements by gas holes is discussed in U.S. Pat. No. 6,867,896, "Interferometric Modulation of Radiation," issued Mar. 15, 2005. In that approach, the desire was to speed up the response time, and all of the elements had the same pressure resistance as they all had the same pattern of holes. As the movable members of the elements deflect, they all have uniform pressure resistance.

Figure 2A:
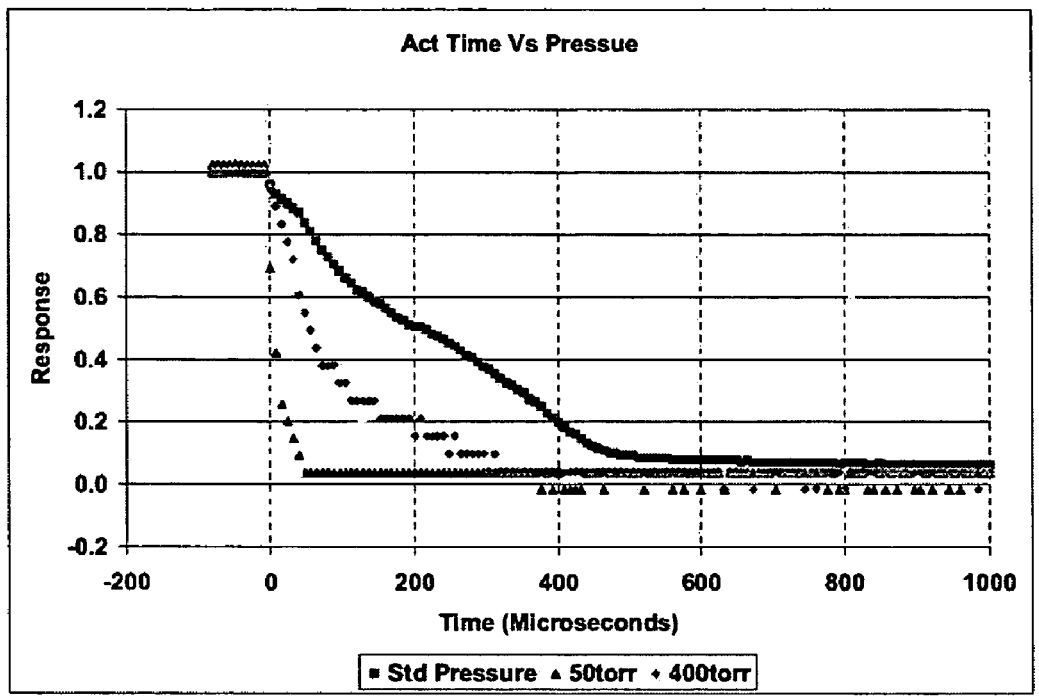
FIGS. 2a and 2b shows graphs of operational times related to pressure.
Figure 2B:
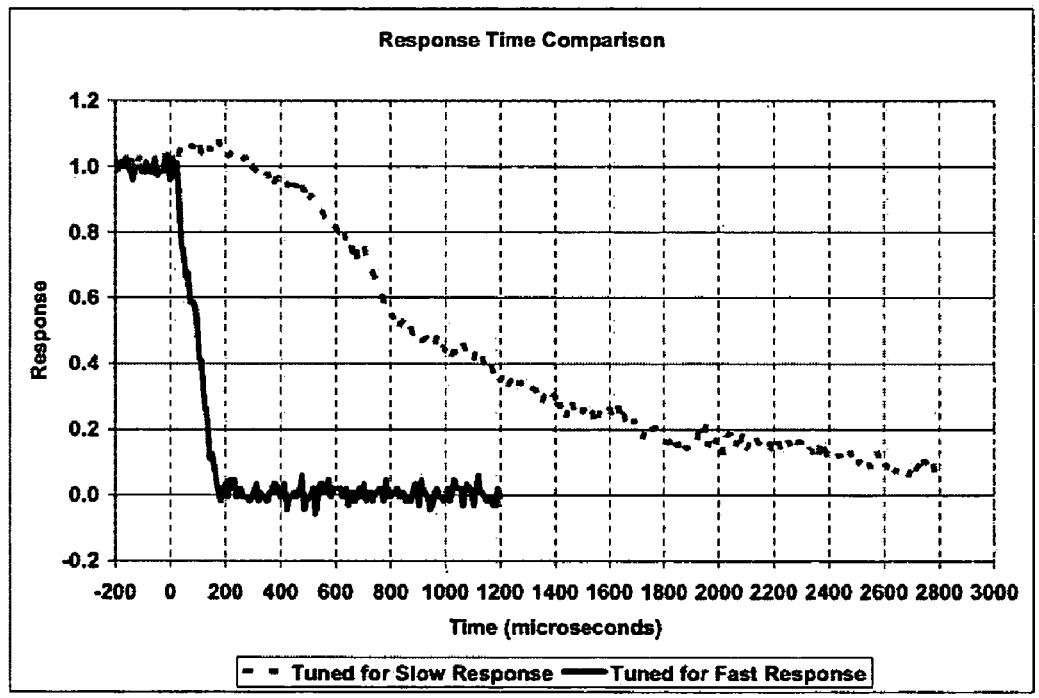

A graph of response time versus pressure is shown in FIG. 2a. As can be seen from the 3 different plots, gas pressure is the dominant factor in the response of the device. FIG. 2b shows the response times of two different elements. The top curve is the response time for an element tuned to have a slower response. The bottom curve is the response time for an element tuned to have a faster response. This variation of pressure resistance between the devices can be exploited.

The variation of pressure resistance can be applied to different movable elements. These include switches, different types of display elements, tunable capacitors, etc. With regard to display elements, providing extra spaces for the gas to escape may speed the response time. In display applications, MEMS elements are typically arranged in an x-y grid on a substrate. Depending upon the size of the elements, they may be further grouped into subarrays, where each subarray forms a picture element, or pixel, of the resulting image seen by a viewer. A portion of such an array is shown in FIG. 3.

Figure 3:
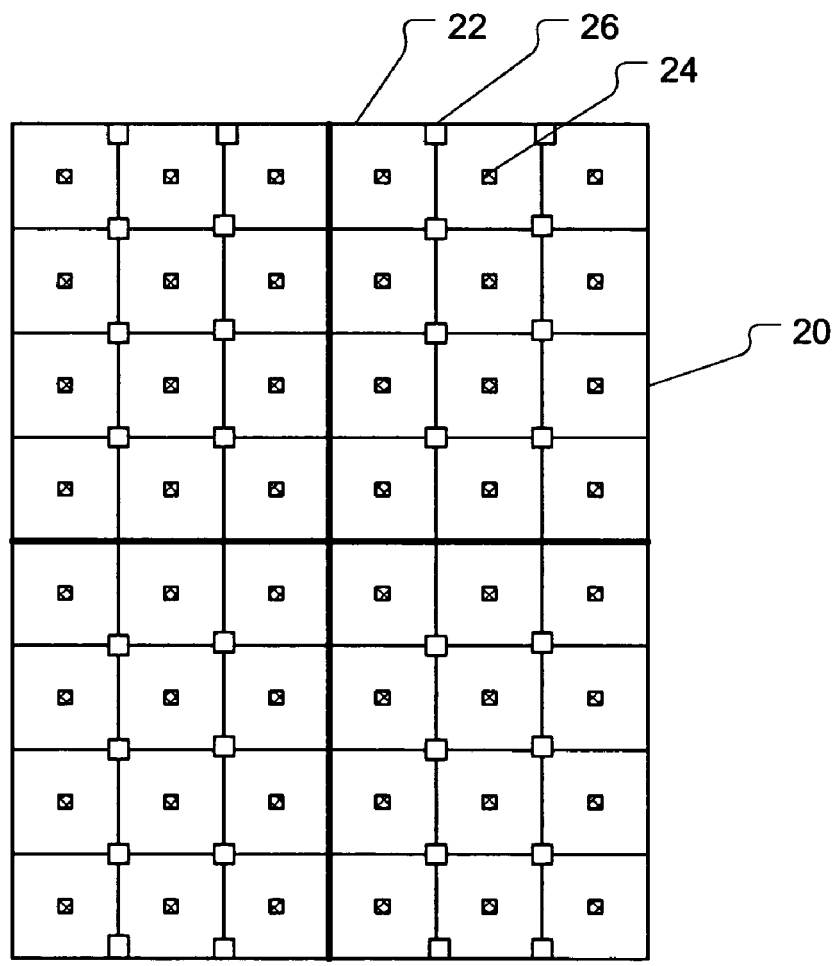
FIG. 3 shows an embodiment of an array of display elements.

In FIG. 3, a portion of an array of movable elements is shown. The movable elements are grouped into subarrays corresponding to pixels, such as subarray 20. Each element in the array comprises a surface having a hole in the center to allow the gas to escape when the movable member of the element is actuated and moves. While this particular structure is based upon an interferometric modulator, these holes could be used for many different types of structures. To vary the pressure resistance of the element, the size of the holes would be varied, providing elements with different response times.

Figure 4A:
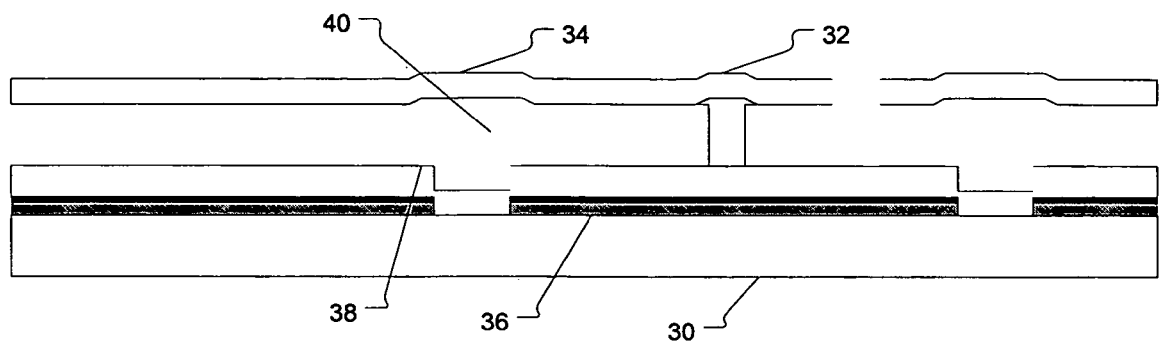
FIGS. 4a and 4b show cross-sections of alternative embodiments of a display element.

Interferometric modulators, such as the iMoD™, rely upon interference effects operating on light inside the cavity to modulate the light in accordance with image data. A cross-sectional view of such a modulator is shown in FIG. 4a. In this embodiment, the viewing surface would be at the 'bottom' of the picture. The modulator array is formed on a transparent substrate 30. An optical stack 36 forms a first optically active surface that may be affected by the second optically active surface, the mechanical or mirror layer 33. A dielectric layer 38 typically protects the optical stack layer. The mechanical layer 32 is supported by posts such as 32, with the location of posts forming the individual elements of the array.

When the circuitry on the substrate, not shown, is activated in a particular region under the mechanical layer, such as that portion of layer 34 that is suspended over cavity 40, the mechanical layer deflects towards the optical stack 36. As it deflects, the mechanical layer causes the portion of the optical stack as seen by the viewer to appear black. Therefore, by addressing the mechanical layer with image data, an image would be seen by the viewer. This particular embodiment of an interferometric modulator may be referred to as a monolithic interferometric modulator here.

Figure 4B:
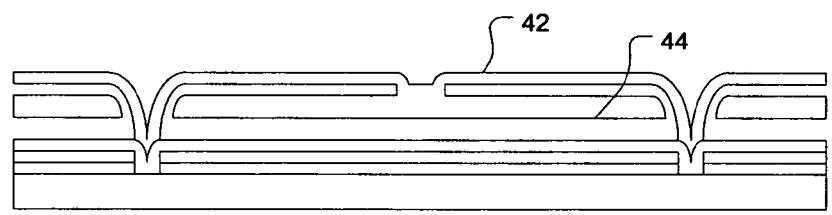

In an alternative embodiment of an interferometric modulator shown in FIG. 4b, the mirror 44 that causes the pixel to appear black when deflected is separated from the support layer 42. This may be referred to as a separable modulator here. In either case, the trapping of gas that is resident inside the array packaging may be used to alter the response time of the movable elements. The general principles of such will be discussed with regard to the monolithic embodiment, with adaptations for the separable modulator being discussed later.

Figure 5:
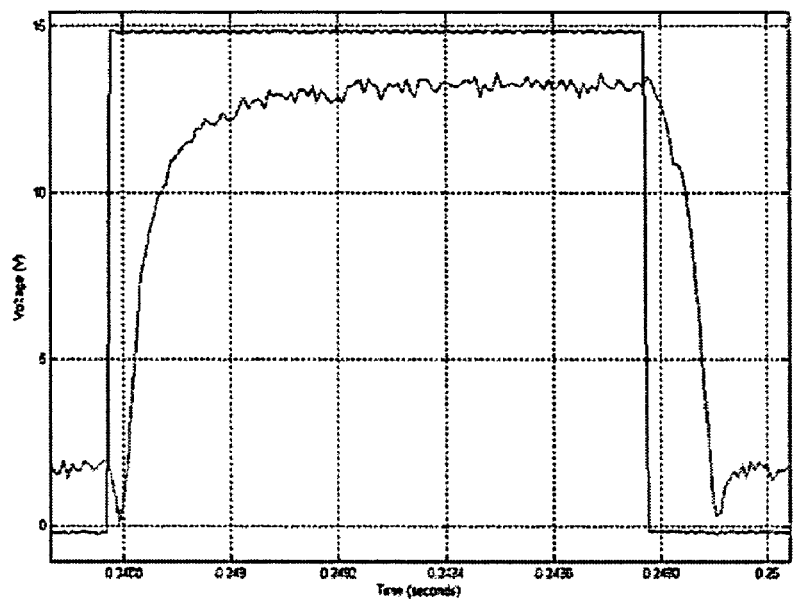
FIG. 5 shows an actuation/release response curve for an embodiment of a display element.

In one embodiment of the modulator, the layer 34 of FIG. 4a may be seen by the viewer. However, the holes are so small that no objectionable artifacts would typically be created by forming holes in the center of the portions that actuate. In FIG. 4b, the holes would be made in the mirror 44, in the supporting layer 42, or both. Holes made in the supporting layer 42 would not be seen by the viewer, as they would be shielded by the mirror 44. By adding the holes to the surface, the response time would be altered. The response time for this type of element is shown in FIG. 5. As can be seen these elements have a response time of approximately 200 microseconds.

Figure 6:
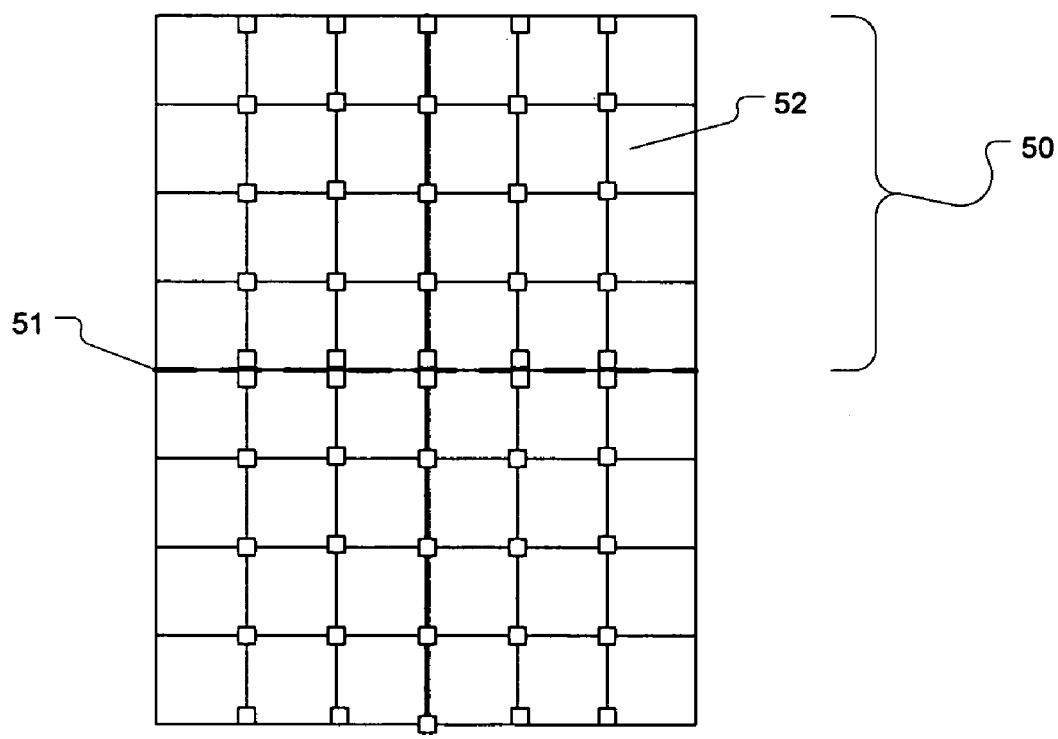
FIG. 6 shows an alternative embodiment of an array of display elements.
Figure 7:
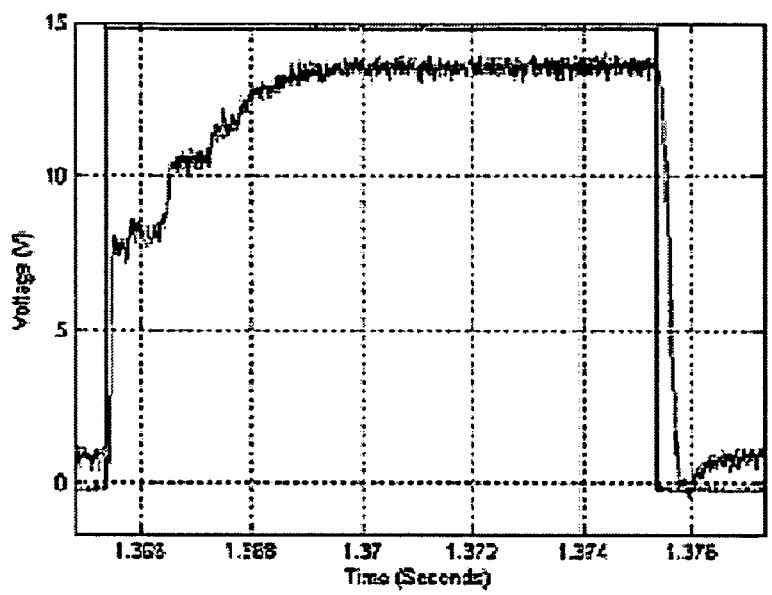
FIG. 7 shows an actuation/release response curve for an alternative embodiment of a display element.

In contrast, a portion of an array of elements without the holes is shown in FIG. 6. The pixel 50, comprised of several subpixels and referred to here as a macropixel, would have individual elements such as 52, without holes in their surfaces, and edge 51 is a free edge represented by a dashed line. The response time for this type of modulator is shown in FIG. 7. As can be seen, the response time approaches 3 milliseconds. In the experiments conducted to gather this data, the two modulators were manufactured from the same wafer, so other factors, such as dielectric charging, that might affect the response time would be similar for both. The longer response time is only due to the trapping of the gas under the modulator elements.

Figure 8:
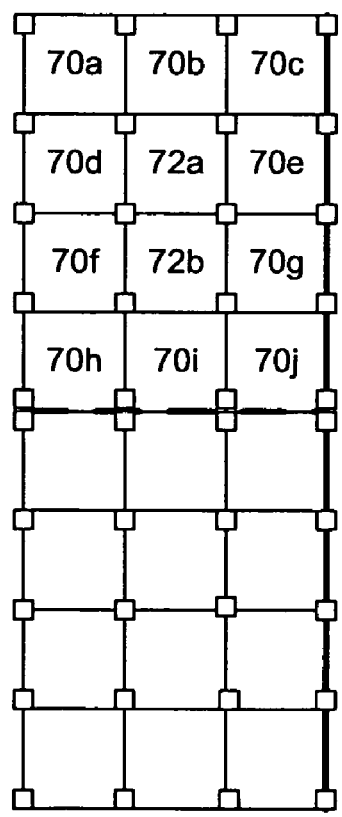
FIG. 8 shows an embodiment of a picture element comprised of several display elements having differing levels of pressure resistance.

This characteristic can be exploited to provide finer control of the movable elements. For example, in the monolithic modulator, such as that shown in FIG. 8, the edge elements 70a–j may be manufactured to have a lower mechanical resistance than the elements in the middle of the pixel 72a and b. When an actuation signal is applied at a first level, such as the beginning portion of a ramp signal, the edge elements would move first, having less mechanical resistance to the attractive forces drawing the movable member towards the substrate. As the edge elements move, they cause gas to be trapped under the elements in the middle of the pixel, in this example 72a and 72b. One method of fabricating modulators having different mechanical stiffness can be found in U.S. Pat. No. 6,574,033, "Microelectromechanical System Device and Method for Fabricating Same," issued Jun. 3, 2003.

The trapped gas provides another opportunity to control the response time of the final two elements of the pixel. As the actuating signal attains a second level, the middle elements would then move. In this manner, controlling the voltage allows a system designer to provide pulses of varying times or voltages to determine how many elements of a pixel move and affect the resulting pixel seen by the viewer.

Other variations on this approach without holes exist. For example, a first set of elements on a free edge of the pixel, such as 70a, 70d, 70f and 70h could be designed to deflect first. A second set of elements on a second free edge, such as 70c, 70e, 70g and 70j could then move after the first set, instead of simultaneously as discussed above. The mechanical resistance as discussed above could control the movement timing. It may be desirable to move the first edge and the second edge simultaneously in some applications, or separately in others.

An example of an approach that varies the mechanical resistance may include altering the post spacing of the modulator posts. The modulator of FIG. 8 has wider gaps between the posts of the edge pixels 70a–70j, than those posts used for the elements in the middle. This can be seen more clearly by comparing element 52 of FIG. 6 with element 70c of FIG. 8. Other types of variation of mechanical resistance are also possible.

Figure 9:
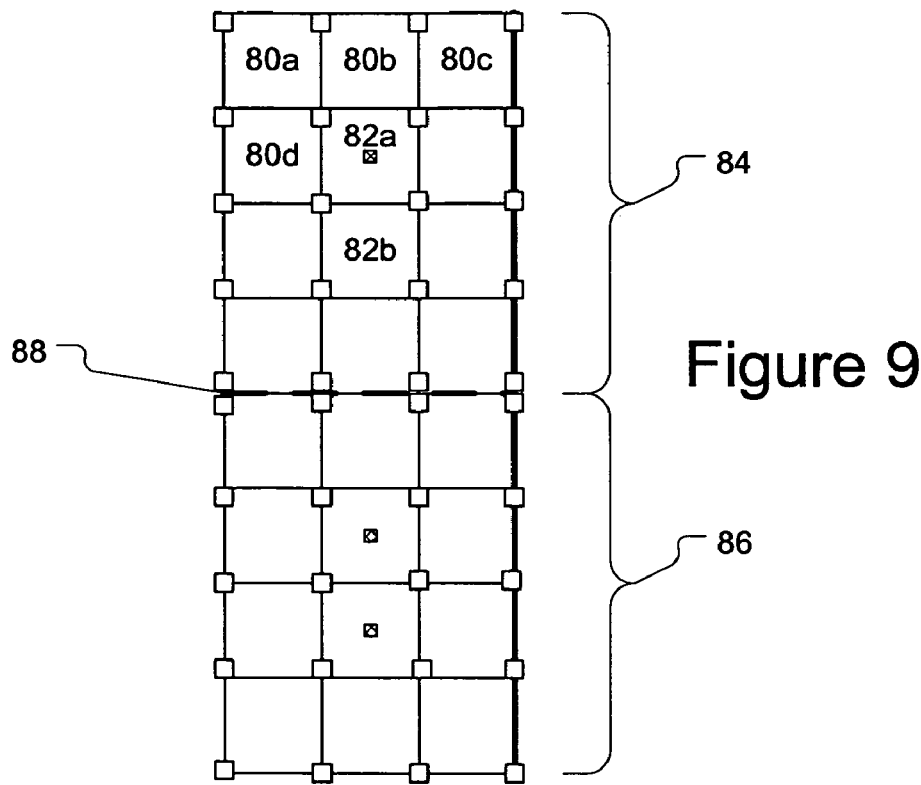
FIG. 9 shows an alternative embodiment of a picture element comprised of several display elements having different levels of pressure resistance.

In an alternative embodiment, it is possible to form holes in the back surfaces of the movable elements, as is shown in FIG. 9. The center elements 82a and 82b have center holes that allow any trapped air to escape. This may allow for another level of response time. The edge elements having a lower mechanical resistance to the actuation signal may responds first, then the middle element 82a with the hole, followed by the element 82b without the hole. Again, this allows control of the actuation signal to different levels to effect different numbers of elements used to form the resulting pixels.

In the above embodiments, then, there is provided an array of movable elements. Each element has a movable member and a cavity through which the member moves. The pressure resistance of the elements are varied such that at least one element has a different level of pressure resistance than the other elements in the subarray or pixel. The difference may be because of air forced under the element by the collapse of neighboring elements, or because of the presence or absence of holes patterned into a surface of the element.

Returning to FIG. 4b, it is possible that these general principles may be applied to elements not having the advantage of the monolithic mirror or mechanical layer such as those discussed above. The movable element 44 may also be formed with holes in it, allowing trapped gas to escape. Alternatively, the support layer 42 may be manufactured to be larger than shown here, so as to move and cover the edges of the mirror when the mirror moves, thereby trapping gas under the mirror. In addition, channels could be manufactured to restrict or release air between the mirrors.

In another alternative, the mirror 44 could be formed of two parts or two layers. The first layer would be larger and thinner than the second. The second layer would be deposited on the first, but have less surface area, forming a mirror having a center, rigid portion and a flexible outer portion. When the mirror moves, the flexible portion would collapse first and trap gas under the edges of the mirror.

Figure 10:
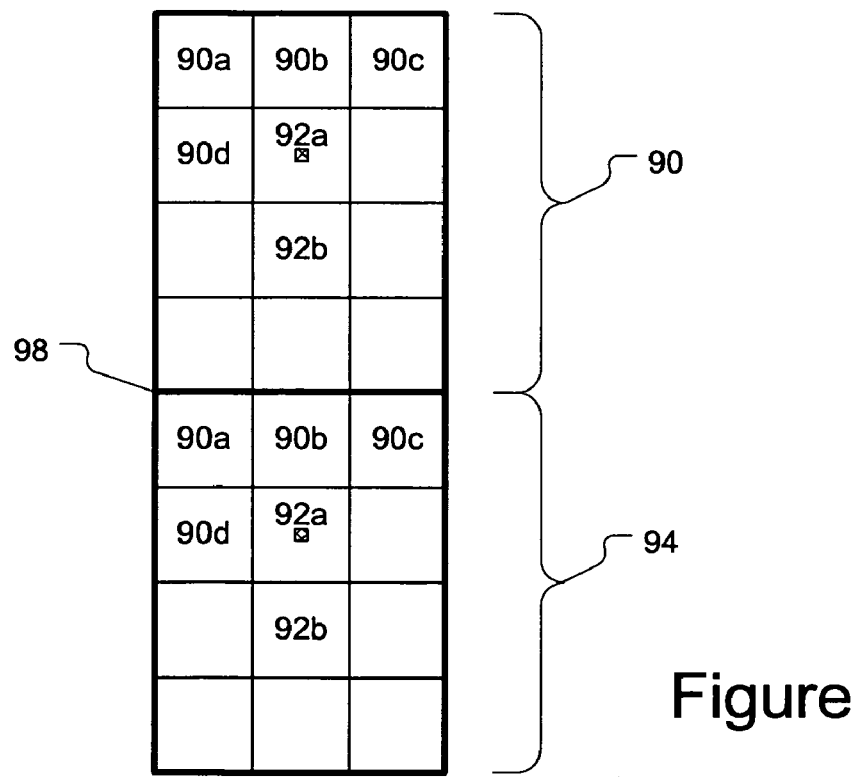
FIG. 10 shows an alternative embodiment of a picture element having rails for support.

In another embodiment, it is possible that the mirrors or movable elements be supported on all four sides, with the mirror resting on 'rails.' This is shown in FIG. 10 where there are not any posts, each sub element and each macropixel being supported from the sides. Any gas trapped under the macropixel 90 would be isolated from any gas trapped under macropixel 96. One embodiment would have the rail 98 between the two macropixels be manufactured so as to not allow any gas movement. In addition to the holes in the individual subpixels, it would then be possible to also control the response time by forming or choosing not to form holes in the rails around the subpixels, such as between 92a and 92b. If holes are formed in the rails, the gas would be allowed to escape more quickly when under pressure from a moving element, and the response time would be altered.

In yet another embodiment, the substrate may be patterned with structures, such as bumps or grooves to facilitate gas movement. This additional aspect would be applicable to any of the previously mentioned embodiments. It is also possible that the movable element itself would have bumps on it to facilitate gas movement. The patterns of the bumps and grooves may vary across different elements of a macropixel, to provide the variable pressure resistance desired.

In addition to alternative types of elements being used, the two interferometric modulators merely serving as examples of devices to which this invention could be applied, it is possible that the gas-trapping characteristic can be exploited on the release part of the cycle rather than the actuation portion. This was discussed above with regard to FIG. 1. However, given the amount of space on the backside of the mirror and the packaging complexities involved, trapping gas on the actuation cycle is probably more practical. However there is no intention to limit application of this invention to only the actuation cycle.

The discussion up to this point has mentioned that the substance trapped under the elements as a gas. This gas is more than likely air, although different gases may be used. Using a gas having a density less than air may increase the response time even further, as elements would have even lower pressure resistance. The damping force provided by the gas is determined by its properties, such partial pressure, density, and viscosity. The geometry of the device as well as the geometry of the gas molecules may also have an effect.

In the particular example of the interferometric modulators, these elements have a response time in the nanosecond range when operating in a vacuum. When packaged with air, they respond in the microsecond range. Therefore, it would seem that elements having a faster response time in a vacuum might employ a different gas than air to tune their response times to the optimal operating range for that type of element.

Thus, although there has been described to this point a particular embodiment for a method and apparatus for altering the response time of MEMS elements, it is not intended that such specific references be considered as limitations upon the scope of this invention except in-so-far as set forth in the following claims.

What is claimed is:

1. An array of elements on a substrate, each element comprising:
   a cavity; and
   a movable member configured to move through the cavity, wherein the movable member of a first element has a first resistance to motion in a first state and the movable member of a second element has a second resistance to motion in the first state, and wherein the first resistance is different from the second resistance such that the first element and the second element have different actuation times.

2. The array of claim 1, wherein the movable member comprises holes to allow gas to escape when the movable member moves.

3. The array of claim 2, wherein different elements in the array have different patterns of holes.

4. The array of claim 1, wherein the movable member comprises a flexible portion and a rigid portion such that when the movable member moves through the cavity, the flexible portion collapses to trap gas between the rigid portion and the substrate.

5. The array of claim 1, wherein the movable member comprises a movable mirror formed from a support layer.

6. The array of claim 1, wherein the movable member comprises a movable mirror suspended over the cavity by at least one support post.

7. The array of claim 6, wherein the support post comprises support rails.

8. The array of claim 7, wherein the support rails comprise holes to allow gas to escape.

9. The array of claim 1, wherein each element further comprises a support layer to block edges of the movable member thereby trapping gas between the movable member and the substrate.

10. The array of claim 1, wherein the first movable member is configured to have a mechanical stiffness that is different from the second movable member.

11. The array of claim 1, the array further comprising an x-y grid of modulator elements forming a pixel, wherein modulator elements at an outer edge of the pixel are arranged so as to actuate first, increasing the resistance to motion of the movable member of elements at the middle of the pixel.

12. The array of claim 11, wherein the modulator elements at the outer edge of the pixel have lower mechanical stiffness, thereby causing gas to trap under the elements at the middle of the pixel.

13. The array of claim 1, wherein each element is configured to operate as at least one of the following devices: display elements, switches, tunable capacitors, and interferometric modulator elements.

14. The array of claim 1, each element further comprising at least one of a bump and a groove defining at least a portion of the cavity to facilitate gas flow.

15. The array of claim 1, wherein the first element is actuated before the second element when the same actuation signal is applied to both elements.

16. The array of claim 1, wherein each element is in the first state when no actuation signal is applied to the element.

17. The array of claim 16, wherein each element is in a second state when the element is actuated by an actuation signal.

18. A method of manufacturing an array of elements, the method comprising:
   forming movable members displaced from a substrate over a cavity such that a movable member of a first element has a first resistance to motion in a first state and the movable member of a second element has a second resistance to motion in the first state, wherein the first resistance is different from the second resistance such that the first element and the second element have different actuation times.

19. The method of claim 18, wherein the first resistance is configured to be different from the second resistance by manufacturing the first element to have a lower mechanical resistance than the second element, thereby causing the first element to actuate in such a manner as to force gas into the cavity of the second element.

20. The method of claim 18, wherein forming movable members further comprises forming movable members with holes patterned in a surface of the movable member.

21. The method of claim 20, wherein the holes form a first pattern on at least one of the movable members, and the holes form a second pattern on others of the movable members.

22. The array of claim 18, wherein each element is in the first state when no actuation signal is applied to the element.

23. The array of claim 22, wherein each element is in a second state when the element is actuated by an actuation signal.

24. A method of operating an array of light modulator elements on a substrate arranged into subarrays as pixels, the method comprising:
providing an actuation signal at a first level, thereby causing a first set of elements in the pixel to actuate thereby trapping gas between other elements in the pixel and the substrate; and
providing an actuation signal at a second level, causing a second set of elements in the pixel to actuate according to a response time determined by the pressure resistance.

25. The method of claim 24, wherein causing a first set of elements to actuate further comprises causing elements on a first edge of the pixel to actuate.

26. The method of claim 24, wherein causing a first set of elements to actuate further comprises causing elements along a second edge to actuate simultaneously with the elements along a first edge.

27. The method of claim 24, wherein causing a first set of elements to actuate further comprises causing elements along a second edge to actuate after the elements along a first edge.

28. The method of claim 24, wherein the second set of elements alter the pressure resistance of the elements by holes patterned in their surfaces.

29. An array of interferometric modulators, each interferometric modulator comprising:
a first layer;
a second layer comprising a movable member, wherein the movable member further comprises holes to allow gas to escape when the movable member moves; and
a cavity defined by the first and second layers,
wherein the movable member is configured to move through the cavity in a direction substantially perpendicular to the first layer, and wherein the holes of a first interferometric modulator of the array have a first configuration and the holes of a second interferometric modulator of the array have a second configuration different from the first configuration.

30. The array of claim 29, wherein the movable member of a first interferometric modulator is configured to have a different resistance to motion from the movable member of a second interferometric modulator.

31. The array of claim 29, wherein one of the first and second layer is fully reflective and the other is partially reflective.

32. The array of claim 29, wherein the movable member is movable through a range of positions including an actuated position an unactuated position.

33. The array of claim 29, wherein each interferometric modulator reflects light of a first set of wavelengths when the movable member is unactuated, and reflects no light or light of a second set of wavelengths when the movable member is actuated.

34. The array of claim 29, wherein the first configuration comprises a first pattern and the second configuration comprises a second pattern different from the first pattern.

35. The array of claim 29, wherein the first configuration comprises a first size and the second configuration comprises a second size different from the first size.

* * * * *

UNITED STATES PATENT AND TRADEMARK OFFICE
CERTIFICATE OF CORRECTION

| | | |
|---|---|---|
| PATENT NO. | : 7,119,945 B2 | Page 1 of 1 |
| APPLICATION NO. | : 10/794737 | |
| DATED | : October 10, 2006 | |
| INVENTOR(S) | : Kothari et al. | |

It is certified that error appears in the above-identified patent and that said Letters Patent is hereby corrected as shown below:

On Title Page

Item 56, Page 3, Col. 2, Line 17 under U.S. Patent Documents, after "3/2004" delete "MIles et al." and insert --Miles et al.--, therefor.

Item 56, Page 4, Col. 1, Line 13 under Other Publications, delete "Anti-Reflective" and insert --Anti-Reflection--, therefor.

Item 56, Page 4, Col. 2, Line 21 under Other Publications, after "Using" insert --Optical--.

Sheet 2 of 6, Figure 2a, Line 1, delete "Pressue" and insert --Pressure--, therefor.

Column 8, Line 31, In Claim 32, after "position" insert --and--.

Signed and Sealed this

Sixth Day of November, 2007

JON W. DUDAS
*Director of the United States Patent and Trademark Office*